Sept. 15, 1970  S. D. DAVIES ET AL  3,528,752
GAS TURBINE ENGINES
Filed April 12, 1967  2 Sheets-Sheet 2
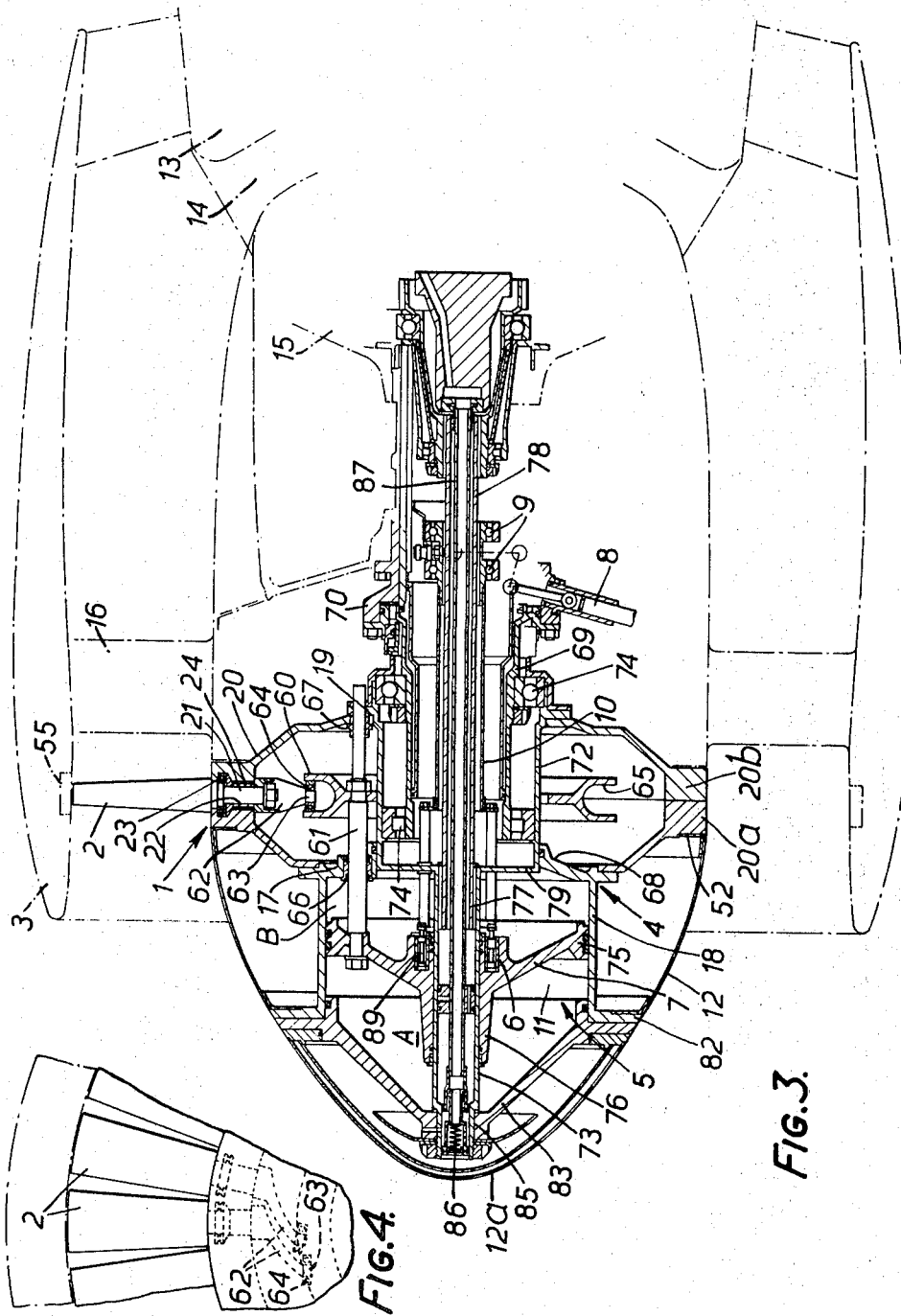
STUART DUNCAN DAVIES
JOHN ALFRED CHILMAN
INVENTORS
BY Young & Thompson
ATTORNEYS

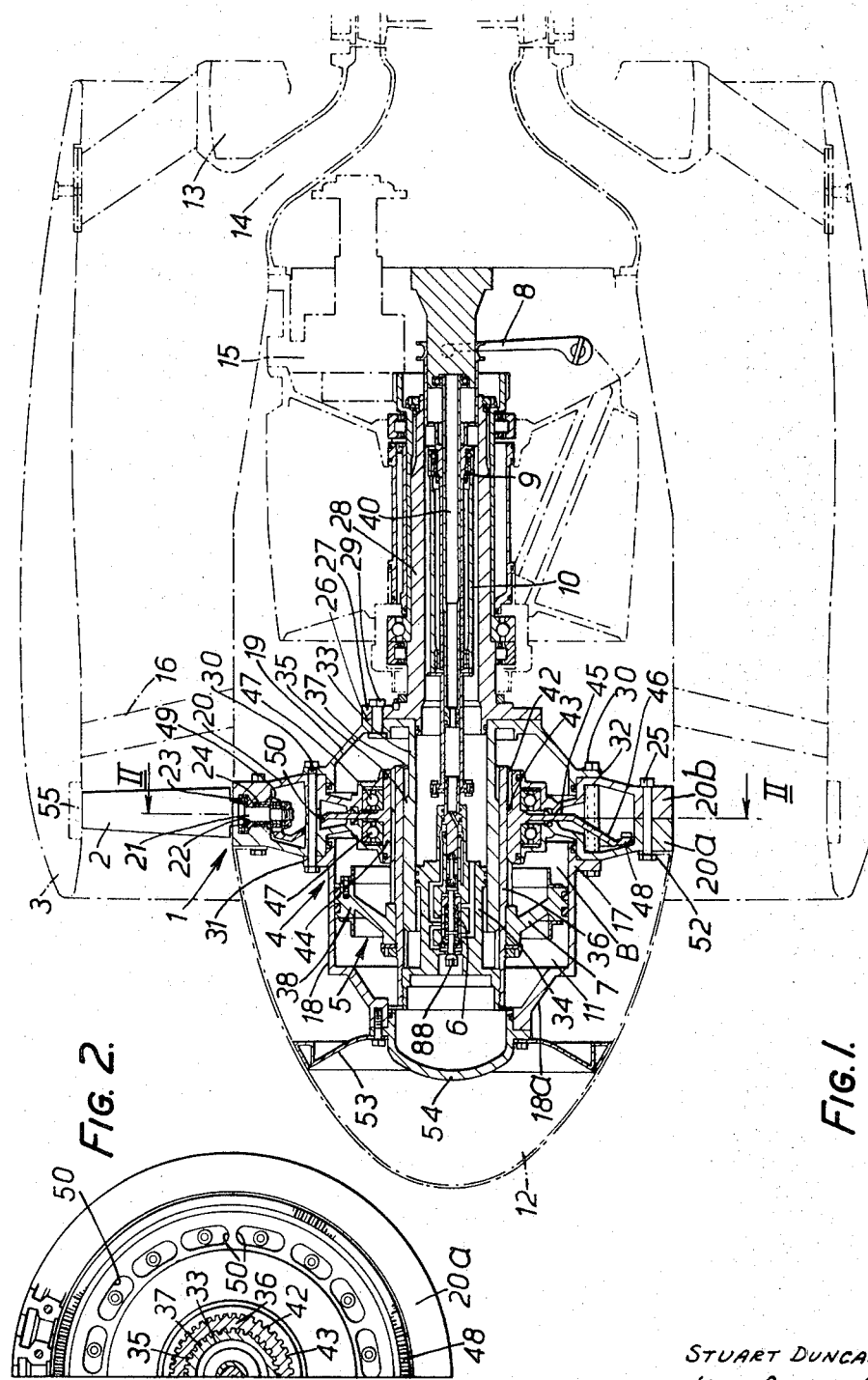

3,528,752
GAS TURBINE ENGINES
Stuart Duncan Davies and John Alfred Chilman, Painswick, England, assignors to Dowty Rotol Limited, Gloucester, England
Filed Apr. 12, 1967, Ser. No. 630,253
Claims priority, application Great Britain, Apr. 12, 1966, 16,008/66; May 25, 1966, 23,428/66; Sept. 12, 1966, 40,543/66
Int. Cl. F01d 7/00
U.S. Cl. 415—130                                           11 Claims

ABSTRACT OF THE DISCLOSURE

A gas turbine of the ducted-fan by-pass type includes a fan having a flow-varying blading and rotatable in a duct, the fan being mounted ahead of the engine compressor and having its blading effectively adjustable under the control of a servo system housed, at least in part, within a hub structure of the fan. The hub structure, blading and servo system is arranged to rotate as an assembly coaxially with the engine turbine by which it is driven. In preferred constructions the blading is of variable pitch, with a hydraulic servo system including a pitch-change motor and follow-up servo valve.

---

This invention relates to gas turbine engines and more particularly to gas turbine engines of the ducted-fan by-pass type.

According to the invention a gas turbine engine of the by-pass type includes a fan having flow-varying blading and rotatable in a duct, the fan being mounted ahead of the engine compressor and having its blading effectively adjustable under the control of a servo system housed, at least in part, within a hub structure of the fan, the hub structure, blading and servo system being arranged to rotate as an assembly coaxially with the engine turbine by which it is driven.

It will be understood that the term "ahead" is used herein in the aerodynamic sense, i.e. to indicate that the fan is upstream of the engine having regard to the direction of air flow through the latter. However, it is preferred that the fan should also be mounted ahead of the engine compressor in the structural sense at one end of the engine. This will usually be the forward end when the engine is designed for use as an aircraft power plant.

The blading will normally be of variable pitch type and the servo system is preferably hydraulic and may comprise a hydraulic pitch-change motor connected to all the blades of a multi-blade variable pitch fan and operable under the control of a manually operable valve, the motor following up controlling movements of the valve in closed-loop manner to provide a servo mechanism with precise positional control. The motor preferably comprises a piston and cylinder device and in such case, therefore, the hydraulic cylinder, piston and control valve, together with the hub structure of the fan in which they are housed and the blades carried by such hub structure, form a rotative assembly within a non-rotative duct. Preferably a spinner is provided to enclose the forward part of the hub structure and forms part of the rotative assembly.

The fan may be directly coupled to the engine compressor, if necessary with the interposition of a reduction gear, so as to be driven therewith. Alternatively, the fan may be directly coupled to and driven by a free turbine section of the engine. The motor may include a helical cam mechanism whereby linear movement of an output member of the motor effects, through this mechanism, angular movement about the axis of rotation of the fan of gear teeth lying on a pitch circle of large diameter relatively to that of the pitch circle of gear teeth fast with each of the multiplicity of blade roots and with which the first gear teeth are in mesh, thereby to change the pitch of all the blades in unison. Thus, for example, the first gear teeth may be provided by a bevel gear of large diameter relatively to that of small bevel pinions, one fast with each blade root.

Preferably the hub structure comprises a rear casing, a front casing and a hub carrying the fan blading and sandwiched between said front and rear casings. The hub is preferably of hollow annular, i.e. substantially toroidal, form and of larger diameter than the front and rear casings. Consequently the sandwiching of the hub by such casings is effected at a point inwardly of its periphery. Preferably the hub is split, comprising front and rear halves bolted together to hold the blades between them. The same ring of bolts as holds the front and rear halves of the hub together may also pass through holes in flanges of the rear and front casings and thus additionally serve for the sandwiching of the hub between such casings.

In one preferred embodiment the rear casing is open at its front end, with its rear end comprising a wall normal to the axis of rotation of the fan which serves for the attachment of the rear casing, and thus of the whole rotative assembly, to a fan mounting flange at the forward end of an engine drive shaft, compressor or reduction gear shaft, all coaxial with the rotation axis of the compressor/turbine system of the engine. The rear end wall may be annular and have extending forwardly from its inner edge a hollow cylindrical spigot which forms the centre of the hub structure and projects through the hollow centre of the hub and into the front casing. Both inside and outside diameters of the hollow spigot may be machined to provide coaxial cylindrical surfaces for axial sliding movement thereon of inner and outer portions of a piston assembly of the pitch-change motor.

As an alternative, in another embodiment the rotative assembly is rotatably supported on a fixed hollow spigot which projects into the hub structure and is arranged for bolting to a non-rotatable mounting flange of the engine. In this case a drive shaft for the fan passes centrally through the spigot, and may be in driving connection with the rear casing.

The invention will now be further described with reference to the accompanying drawings which illustrate, by way of example, portions of two gas turbine engines embodying forward mounted fans in accordance with the invention. In the drawings:

FIG. 1 is an axial sectional view illustrating the forward end of one of the engines, including details of the fan structure, FIG. 2 is a half-section through the hub of the fan on the line II—II of FIG. 1, FIG. 3 is a view similar to FIG. 1 of the forward end of the other engine, and FIG. 4 is a fragmentary front end view illustrating the arrangement of the fan blading in the engine of FIG. 3.

Each of the engines is of the by-pass type and includes a fan, indicated generally by the reference numeral 1, having flow-varying blading 2 and rotatable in a static by-pass duct 3. The fan 1 is mounted at the forward end of the engine ahead of the engine compressor with the blading 2 effectively adjustable in pitch under the control of a servo system of the closed-loop type housed within the hub structure 4 of the fan. The servo system includes a hydaulic pitch-change motor 5 and a follow-up servo valve 6 mounted within a piston assembly 7 of the motor 5.

The piston assembly 7 is connected to all the blades 2 of the fan 1, and the servo valve 6 is manually operable through a control linkage 8, only the engine end of which is shown in the drawings and which acts through a translation bearing or bearings 9 to produce axial, pitch-changing movements of a pitch control tube 10. The control tube 10 passes coaxially through the hub structure 4 and is connected with the valve 6, so that te control linkage 8 produces axial movement of the servo valve 6 within the piston assembly 7 which movement is followed-up by the motor 5 in closed-loop manner to provide precise positional control. A hydraulic cylinder 11 of the motor 5 in which the piston assembly 7 is axially slidable, the piston assembly 7 and control valve 6, together with the hub structure 4 of the fan in which they are housed and the blades 2 carried by the hub structure, form a rotative assembly within the non-rotative duct 3. A spinner 12 encloses the forward part of the hub structure 4 and also forms part of the rotative assembly. The hydraulic oil feed and return to and from the valve 6 is effected inside and outside of the rotatable control tube 10.

The compressor section, combustion system and turbine section of the engine may be of single shaft form, the outline of only the forward end of the compressor being illustrated at 13. A compressor inlet 14 communicates with the by-pass duct and is thus charged by the fan 1, pitch variation of the blading 2 of which not only varies the by-pass ratio but in effect provides a variable first compressor stage. The fan 1 has a large multiplicity of blades 2, for example seventeen or more, and is driven from the engine compressor/turbine shaft through a reduction gearbox illustrated in a general manner at 15. A ring of stator blades 16 of fixed pitch is mounted within the duct 3 rearwardly of the fan 1 and ahead of the compressor inlet 14. The fan blading 2 is capable of movement into negative pitch to reverse the air flow along the duct 3, and when such reverse pitch is selected aerodynamic braking of an aircraft to which the engine is fitted is afforded.

In each construction the hub structure 4 of the rotative assembly comprises a front casing 17 which has a forwardly projecting portion 18 providing the cylinder 11, a rear casing 19, and a hub 20 carrying the fan blading 2 and sandwiched between the casings 17 and 19 inwardly of the hub periphery. The hub 20 is split, comprising front and rear halves 20a and 20b bolted together to hold the blade roots 21 between them.

The blade roots 21 are held in radial bores 22 formed between the meeting faces of the front and rear halves of the hub 20 at its outer periphery. At this distance from the centre, and at the rotational speeds evisaged, the thrust and journal loads are high, particularly the former. Accordingly separate thrust and journal bearings 23 and 24 respectively are interposed between the blade roots 21 and the hub 20, each appropriate to the duties it has to perform. To keep the loads on the hub 20 to an acceptable level the best material for the blades 2 at the present time is titanium. A ring of bolts 25 (see FIG. 1) holds the two hub halves 20a and 20b together in the vicinity of the blade roots 21, one of the bolts 25 being disposed between each two adjacent blade root bores 22.

Referring now to the construction of FIGS. 1 and 2, at its front end the rear casing 19 is open, its rear end comprising a wall 26 normal to the axis of rotation of the fan 1 and which serves for the attachment of the rear casing 19, and thus of the whole rotative assembly, to a fan mounting flange 27 at the forward end of an engine reduction gear shaft 28 through which the control tube 10 passes, all coaxial with the rotation axis of the compressor/turbine system of the engine. For this purpose the rear end wall 26 is provided with a ring of holes registering with a similar ring of holes in the mounting flange 27, driving bolts 29 passing through the pairs of holes in register. The hub 20 is of hollow annular, i.e. substantially toroidal, form and of larger diameter than the casings 17 and 19. An inner ring of bolts 30 which assists in holding the hub halves 20a and 20b together also passes through holes in flanges 31 and 32 of the casings 17 and 19, and thus additionally serve for the sandwiching of the hub 20 between such casings.

The rear end wall 26 is annnular and has extending forwardly from its inner edge a hollow cylindrical spigot 33 which forms the centre of the hub structure 4 and projects through the hollow centre of the hub 20 and into the front casing 17. The inside diameter of the spigot 33 is machined to provide a cylindrical surface for axial sliding movement therealong of an inner portion 34 of the piston assembly 7, within which portion the control valve 6 is coaxially arranged and the valve porting is formed. The outer machined and generally cylindrical surface of the spigot 33 is provided with straight teeth or splines 35 to prevent relative rotation of the piston assembly 7, an intermediate tubular portion 36 of which forms the output member of the motor 5 and is slidable along the outer surface of the spigot 33. The piston assembly portion 36 is formed internally with straight teeth 37 to engage with the spaces between the teeth 35 on the outer surface of the spigot 33.

An outer portion 38 of the piston assembly 7 forms an outer piston slidable axially in the cylinder portion 18 of the front casing 17, and this casing portion is divided by the outer piston 38 into coarse pitch and fine pitch chambers A and B. Manually controlled movement of the control valve 6 operates to admit hydraulic fluid to either the chamber A or B dependent on the direction of valve movement and according to whether the pitch of the blades 2 is to be coarsened or fined. The hydraulic fluid is supplied under pressure to the rear end of the valve 6 through a conduit 40 which is itself supplied by an engine-driven pump (not illustrated) and passes coaxially through the reduction gear shaft 28.

The tubular portion 36 of the piston assembly 7 projects rearwardly in a sleeve-like manner along the spigot 33 through the hollow centre of the hub 20. On its outer surface it is provided with helical teeth 42 which engage the spaces between helical teeth 43 in a hollow boss 44 of a large bevel gear 45. This arrangement of the teeth 42 and 43 provides a helical cam mechanism whereby linear movement of the piston assembly 7 is converted to angular movement of the gear 45 about the axis of rotation of the fan 1.

The bevel gear 45 is disposed, apart from its boss 44, wholly within the hub 20, its web 46 being closely confined between the halves 20a and 20b of the hub 20 near the inner periphery of the latter. At its inner periphery the hub 20 seats upon the external cylindrical surface of the bevel gear boss 44 with the interposition of antifriction bearings 47 between the outer cylindrical surface of the boss 44 and angular portions of the front and rear halves of the hub 20 to act as combined thrust and radial races when angular movement is to be imparted to the bevel gear 45 relatively to the hub 20.

Towards its outer periphery the bevel gear web 46 inclines, that is to say the central portion of the web 46 is dished in relation to its toothed rim 48, such inclination being permitted by the hollow toroidal form of the hub 20 at this diameter. The teeth on the rim 48 mesh with small bevel pinions 49 fast on the blade roots 21.

It will be seen that the ring of bolts 30 by which the hub 20 is sandwiched between the casings 17 and 19 have to pass through the web 46 of the bevel gear 45. To enable this to be done, and the bevel gear yet to be capable of the necessary limited angular movement relatively to the hub 20 to effect pitch adjustment of the blades 2, the web 46 is provided with clearance holes 50, preferably in the form of elongated arcuate slots, for the passage of the bolts 30. As an alternative to such a slotted bevel gear arrangement, the means for effecting angular movement of the multiplicity of small bevel pinions 49 in unison may take the form of a multiplicity of bevel-toothed segments mounted on radial arms or spokes between which the hub bolts 30 pass, the arrangement taking the form of a toothed spider.

The spinner 12 has an inwardly turned flange 52 at its base by which it is bolted to the front half 20a of the hub 20 and an annular plate attachment 53 towards its nose portion, such plate attachment bolting to the forward end 18a of the cylinder portion 18 of the front casing 17 of the hub structure. This forward end 18a of the front casing is frusto-conical in shape and a separate cylinder cover 54 is provided to close the otherwise open smaller end of the cylinder 11.

As will be seen both in FIGS. 1 and 3, the leading edge of the static by-pass duct 3 surrounding the rotative fan assembly is disposed slightly forwards of the base of the spinner 12, and the inner wall of the duct 3 is provided with a nonrotative reinforcing or guard ring 55 in the plane of the fan blades 2 and with which the tips of the blades have a close running clearance. This contains the blades 2 and protects the aircraft from serious damage in the event of blade shedding or bursting of the fan assembly 1.

In the engine of FIGS. 3 and 4 an alternative form of connection is provided between the piston assembly 7 of the pitch-change motor 5 and the multiplicity of blade roots 21. A unison ring 60 positioned coaxially within the hollow hub 20 and surrounding the forwardly projecting rear casing 19 is connected to the piston assembly 7 through a ring of connecting rods such as 61 which provide output members of the motor 5. Each blade root 21 has fast thereon a crank arm 62, the offset crank 63 of which carries a ball bearing 64 the outer race of which engages with a peripheral groove 65 of the unison ring 60. Thus axial movement of the unison ring 60 with the piston assembly 7, under the follow-up control of the valve 6, rotates all the crank arms 62 to effect pitch adjustment of the fan blades 2. The rods 61 pass through guide bushes 66 and 67, mounted respectively in a rear annular end wall 68 of the front casing 17 and in the rear hub half 20b. These guide bushes act to prevent relative rotation of the piston assembly 7 within the hub structure 4.

In this construction the rotative assembly is supported on a forwardly projecting fixed spigot 69 through which the control tube 10 passes and which is bolted to a mounting flange 70 at the forward end of the reduction gearbox 15. A forwardly projecting hollow portion of the rear casing 19 again projects into the front casing 17 but in this case is of stepped cylindrical form. It comprises a larger diameter section 72, which is surrounded by the unison ring 60 and closes the centre of the hollow hub and a forward spigot section 73. The larger section 72 is mounted on the fixed spigot 69 through anti-friction bearings 74, and the forward spigot section 73 again provides a hub centre on which the piston assembly 7 slides. With this construction the assembly 7 is of simpler form with an outer piston portion 75 which slides in the cylinder 11 and divides the latter into coarse pitch and fine pitch chambers A and B, and a central tubular portion 76 which slides on the machined external cylindrical surface of the spigot 73.

At its rear end the spigot 73 is internally splined at 77 to provide a driving connection with a tubular reduction gearbox shaft 78 which projects forwardly into the spigot 73 coaxially through the control tube 10 and the fixed spigot 69. The spigot 73 joins the casing section 72 of the rear casing 19 through an annular radial wall 79, and thus again the hub 20 is driven through the rear casing 19. The cylinder portion 18 of the front casing 17 is in this case formed with an end flange 82 to which a frusto-conical cylinder cover 83 is bolted. The cover 83 projects forwardly into a double-skin nose portion 12a of the spinner 12 which is supported on the cylinder flange 82, the remaining outer portion of the spinner 12 being similarly supported at the forward end and, as before, flanged at 52 for bolting to the front half 20a of the hub 20.

The forward end of the spigot 73 is supported in an end aperture 85 in the cylinder cover 83, and carries an oil pressure relief valve 86 which discharges on to the spinner nose portion 12a to cool the oil and heat the spinner for anti-icing purposes. A conduit 87 leads forwardly coaxially through the hollow drive shaft 78 to fed oil to the control valve 6, such conduit extending to the rear or inlet side of the relief valve 86. As will be seen, the control valve 6 in this embodiment is offset with respect to the rotation axis, being slidable in the piston portion 76 externally of the spigot 73.

In both engines a second valve 88 is arranged in series, in the hydraulic sense, between the control valve 6 and the corse pitch chamber A. The valve 88 is normally in the open position but closes if the piston drifts away from the selected position, due for example to loss of oil pressure or linkage fracture, and forms a hydraulic lock with the oil trapped in the chamber A.

What is claimed is:

1. A gas turbine engine of the bypass type including a fan having a flow-varying blading and embodied in an assembly mounted as a unit ahead of a compressor of the engine, a nonrotative bypass duct in which said fan is arranged to rotate coaxially with a turbine of the engine by which it is driven, said assembly comprising a fan hub structure in which said flow-varying blading is adjustably mounted, a spinner enclosing a forward part of the hub structure, a servo system housed at least in part within the hub structure and including a hydraulic blade-adjusting motor, a hydraulic supply conduit for the motor disposed coaxially within the hub structure and arranged for connection to a hydraulic pressure source rearwardly of the hub structure, with said assembly of hub structure, blading, spinner and servo system arranged to rotate together within said nonrotative duct, the servo mechanism including a servo valve mounted within said hub structure and supplied by said conduit, the valve being operative for hydraulic control of the blade-adjusting motor, and a mechanical control member connected to the servo valve disposed centrally of the hub structure and arranged for connection to a control linkage rearwardly of the hub structure.

2. A gas turbine engine according to claim 1, wherein the hub structure of said rotative assembly comprises a rear casing, a front casing and a hub carrying the fan blading and sandwiched between said rear and front casings.

3. A gas turbine engine according to claim 2, wherein said hub is of hollow annular, i.e. substantially toroidal, form and of larger diameter than the front and rear casings, the sandwiching of the hub by said casings being effected at a point inwardly of its periphery.

4. A gas turbine engine according to claim 2, wherein the hub is split, comprising front and rear halves bolted together to hold the blades between them.

5. A gas turbine engine according to claim 4, wherein the same bolts as hold the front and rear halves of the hub together also serve for the sandwiching of the hub between said rear and front casings.

6. A gas turbine engine according to claim 4, wherein the hub is split, comprising front and rear halves bolted together to hold the blades between them, and a cylindrical portion of the rear casing projects forwardly within the hub to close the hollow center of the latter.

7. A gas turbine engine according to claim 2, wherein the hub is driven through the rear casing.

8. A gas turbine engine according to claim 7, wherein the front end of said rear casing is open, its rear end comprising a wall normal to the axis of rotation of the fan which serves for the attachment of the rear casing, and thus of the whole rotative assembly to a fan mounting flange at the forward end of an engine drive shaft, compressor or reduction gear shaft, all coaxial with the rotation axis of the compressor/turbine system of the engine.

9. A gas turbine engine according to claim 8, wherein said rear end wall is provided with a ring of holes registering with a similar ring of holes in the fan mounting flange, driving bolts passing through pair of holes in register.

10. A gas turbine engine according to claim 8, wherein said rear end wall is annular and has extending forwardly from its inner edge a hollow cylindrical spigot which forms the center of the hub structure and projects through the hollow center of the hub and into the front casing.

11. A gas turbine engine according to claim 6, wherein the hub is driven through said rear casing and said cylindrical portion is rotatably supported on a fixed hollow spigot, which serves for the attachment of the whole rotative assembly, and projects forwardly of the fixed spigot for driving connection to a drive shaft passing through said fixed spigot.

References Cited

UNITED STATES PATENTS

| | | | |
|---|---|---|---|
| 3,242,992 | 3/1966 | Quenneville et al. | 170—160.32 |
| 2,850,103 | 9/1958 | Pearl. | |
| 3,098,632 | 7/1963 | Christenson | 60—262 X |

FOREIGN PATENTS

| | | |
|---|---|---|
| 1,260,746 | 4/1961 | France. |
| 629,540 | 9/1949 | Great Britain. |
| 502,514 | 5/1954 | Canada. |
| 923,996 | 3/1947 | France. |
| 866,145 | 2/1953 | Germany. |
| 595,357 | 12/1947 | Great Britain. |
| 457,026 | 5/1950 | Italy. |
| 244,980 | 6/1947 | Switzerland. |

EVERETTE A. POWEL JR., Primary Examiner

U.S. Cl. X.R.

416—157, 208